April 3, 1934.  J. CAHILL  1,953,151

SPEED REDUCING TRANSMISSION

Filed Nov. 19, 1932   3 Sheets-Sheet 1

Inventor
JOE CAHILL
By Thomas Billyer
Attorney

Inventor
JOE CAHILL

April 3, 1934.  J. CAHILL  1,953,151
SPEED REDUCING TRANSMISSION
Filed Nov. 19, 1932  3 Sheets-Sheet 3
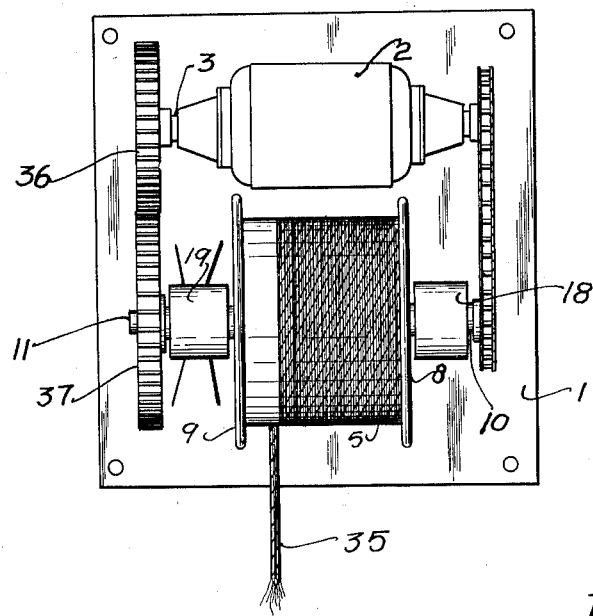
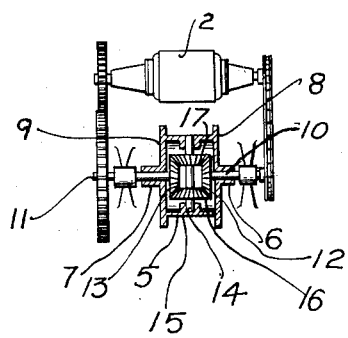
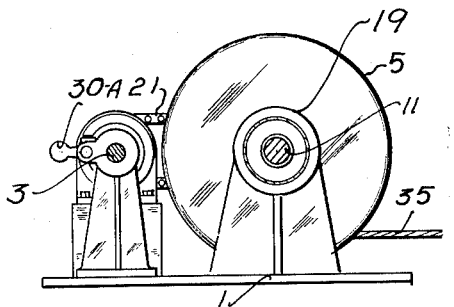
Inventor
JOE CAHILL
Attorney Patented Apr. 3, 1934

1,953,151

UNITED STATES PATENT OFFICE 1,953,151

SPEED REDUCING TRANSMISSION

Joe Cahill, Portland, Oreg., assignor of one-half to Claud W. Kellogg, Portland, Oreg.

Application November 19, 1932, Serial No. 643,440

2 Claims. (Cl. 254—186)

My invention relates to speed reducers. It has for its primary purpose and object the utilizing of a relatively simple and well known construction for the transformation of relatively high speeds into relatively low speeds without using worms and worm gears and other similar speed reducers now in general use.

I utilize a floating housing, or frame, that is comprised of a central member having one, or more removable sides adapted thereto. Stub shafts are journaled within the side walls of the rotatable housing and a relatively short shaft is journaled within the housing. Gears are disposed upon each of the stub shafts that are adapted for coacting with gears disposed upon the relatively short shaft. I predetermine the rate of rotation of the stub shafts by the placing of driving elements thereupon. The rate of rotation of the housing may be predetermined in this manner. I employ a common supporting base upon which any prime mover, as an electric motor is disposed, and I run suitable driving elements from the prime mover to the stub shafts. Any suitable drive may be associated with the rotatable housing as the forming of a shrouded pulley upon its outer surface. A sprocket may also be removably secured to the outer surface of the rotatable housing.

One of the objects of my invention consists in providing a simply constructed device that may be used in the transforming of relatively low speeds. The ratio of reduction being predeterminable.

A still further object of my construction consists in so constructing the assembly that the same may be comprised of parts that are easily made, or that may be acquired in the open market.

And a still further object of my invention consists in so fabricating the assembly that the speed reducer may be easily adapted to various changes of speed by the shifting of a single lever and the associated gears that are adapted for being moved into and out of engagement with coacting gears thereby.

And a still further object of my invention consists in so constructing the device that it may be comprised of a minimum of parts. Each of the parts being comprised of a standard unit, or member and ones that will have relatively long operating life with practical freedom from operating annoyances.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 4 is a sectional, side view of the assembled device.

Fig. 5 is a top, plan view in modified form of the assembled device.

Fig. 6 is a top, plan view, partially in section of the assembled device.

Like reference characters refer to like parts throughout the several views.

Figure 1:
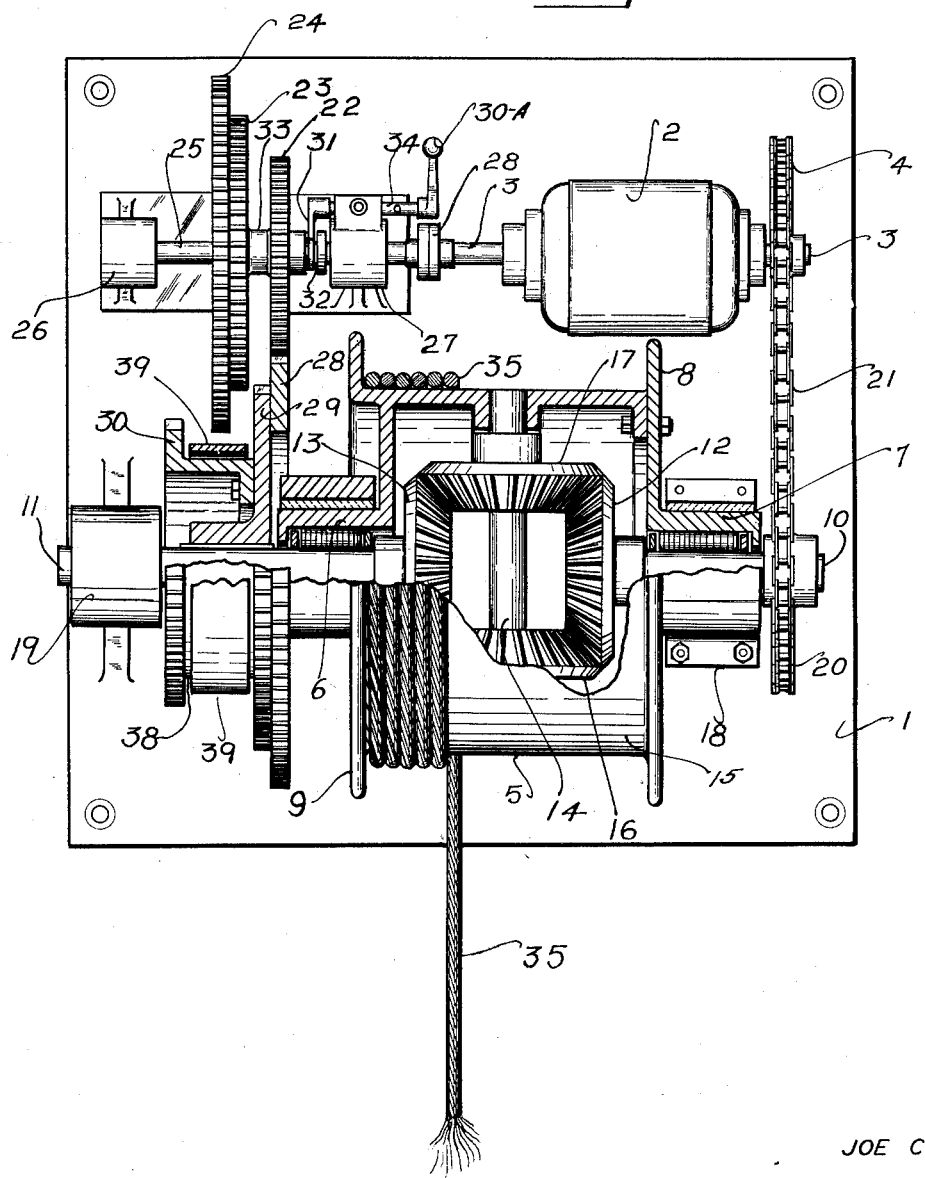
Fig. 1 is a top, plan view, partially in section of the assembled device.
Figure 2:
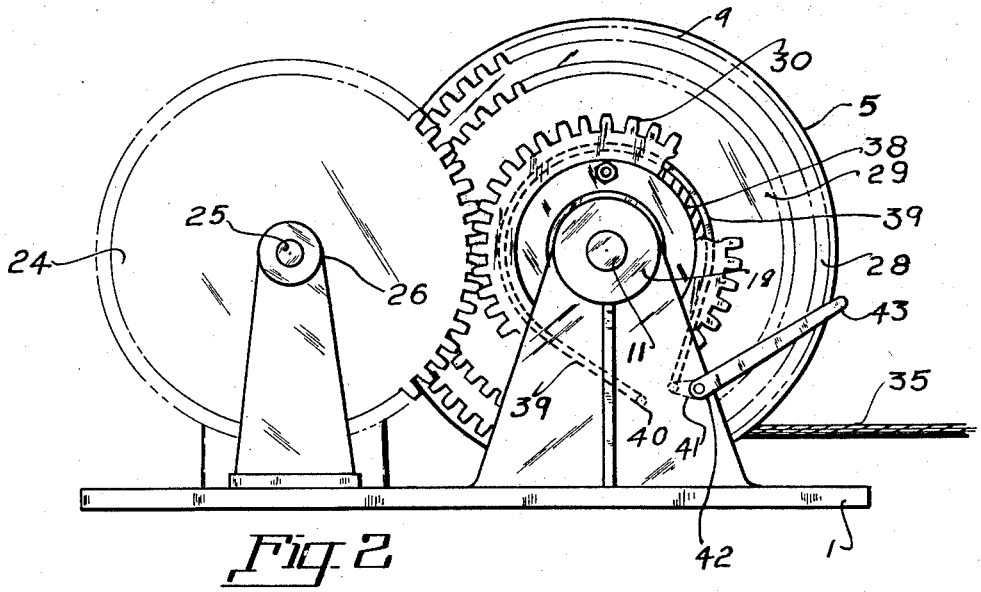
Fig. 2 is a side view of the assembled device. In this view the housing is partially broken away to illustrate the construction of the same.
Figure 3:
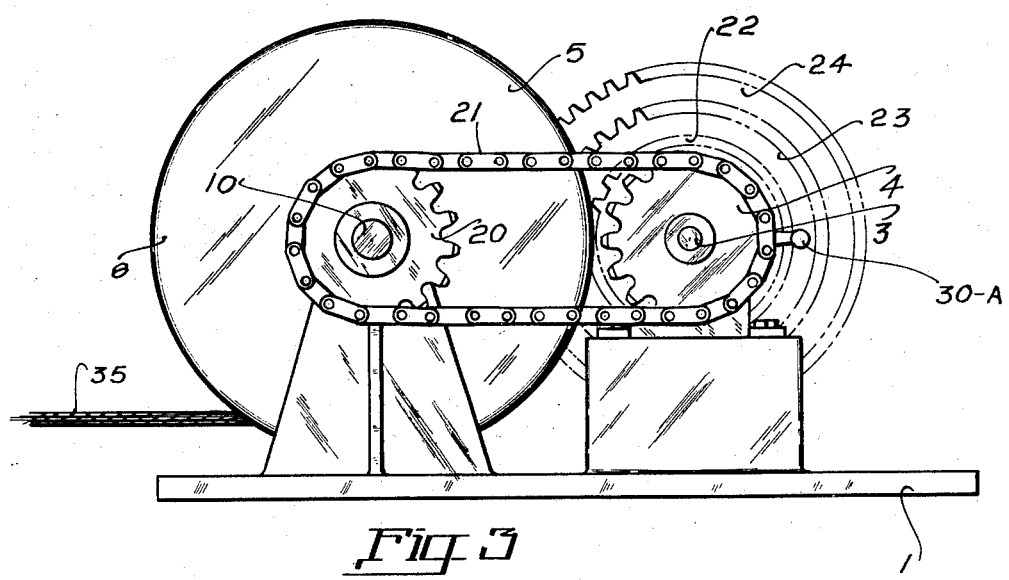
Fig. 3 is a side view of the assembled device. The same is taken from the opposite side to that illustrated in Fig. 2.

My device is primarily intended for use as a speed reducer where relatively large reductions in speed are to be made. I mount my assembly upon a common base 1. I place any power unit, here shown as an electric motor 2, upon the base. Electric current is supplied to the motor from any suitable source of power not here shown. The motor may be energized in various ways, and from various sources of power, as by being connected to any public service line. For remote operations, or where electric energy is not available any other suitable prime mover may be used, as steam, or internal combustion engines.

The armature shaft 3 has a driving sprocket 4 mounted thereupon. Any suitable rotating unit, as a winding drum 5, has hubs 6 and 7 disposed in the oppositely disposed side walls 8 and 9 of the rotating member 5. Stub shafts 10 and 11 are journaled within the respective hubs. The hubs are made sufficiently long to maintain the stub shafts in driving alignment. Bevel gears 12 and 13 are mounted upon the respective shafts.

A shaft 14 is journaled relative to the cylindrical portion 15 of the rotating housing and bevel gears 16 and 17 are mounted upon the shaft 14. The bevel gears 16 and 17 coact with the bevel gears 12 and 13. The winding drum 5 is a floating housing for the universal gear assembly disposed therein and the rotating of the stub shaft 10 in one direction and the rotating of the stub shaft 11 in the opposite direction causes a rotation of the winding drum at a much lesser rate of speed. The speed of rotation of the winding drum depends upon the difference of rotation of the gears disposed upon the stub shafts 10 and 11. This construction provides a winding drum adapted for being driven at a constant speed and a very much lesser rate of speed than that of the stub shaft 10, that is adapted for being directly driven by the prime mover. By the providing of simply constructed elements adapted for being manually manipulated, the speed of the winding drum may be predetermined to meet the requirements of power and the differences of speed required.

The respective stub shafts 10 and 11 are journaled relative to the base 1 within suitable bearing supports 18 and 19. A sprocket 20 is mounted upon the stub shaft 10, and any suitable driving means is trained about the respective sprockets 4 and 20, as a chain 21.

The ratio of driving speed of the prime mover relative to that of the winding drum may be predetermined by the placing of a plurality of gears, here shown as three in number at 22, 23 and 24, upon the shaft 25. The shaft 25 is journaled within suitable journal supports 26 and 27. The shaft is secured to the armature shaft 3, by any suitable coupling 28. A like number of gears, here shown as three in number at 28, 29 and 30 are mounted upon the stub shaft 11.

The gear 22 is adapted for coacting with and driving the gear 28. The gear 23 is adapted for coacting with and driving the gear 29, and the gear 24 is adapted for coacting with and driving the gear 30, but one set of the gears are adapted for being placed in registry engagement with each other at one time. The gears 22, 23 and 24 may be formed integral with each other and are secured to a common body, or hub assembly.

A shift lever 30A is mounted upon the bearing 27 and an arm 31 of the shift lever is adapted to the groove 32 of the hub 33 to which the respective gears 22, 23 and 24 are mounted. The sliding of the shaft 34, upon which the shift lever 30A is mounted imparts longitudinal movement to the shaft and to the arm 31 secured thereto and places the gears 22, 23 and 24, one at a time, into and out of registry with the gears 28, 29 and 30. These gear engagements predetermine the relative rate of speed of the winding drum to that of the prime mover.

The side walls of the winding drum are larger in diameter than the drum itself to thereby form a shrouded drum of the winding drum. A rope, line, or cord 35 is trained about the winding drum.

Where a single reduced speed is required, the device may be made, as illustrated in Figs. 5 and 6 respectively. When so made a single gear 36 may be directly secured to the armature shaft 3, and a single gear 37 is secured to the stub shaft 11, thus the driving ratio of the winding drum will be constant relative to that of the speed of the armature shaft 3.

A brake drum 38 may be secured to the stub shaft 11. When so provided a friction band 39 is placed about the brake drum. One end of the brake band is secured upon its one end to the supporting frame and is held by a pin 40. The oppositely disposed end of the band is hingedly secured to a brake lever 41. The brake lever 41 is hingedly supported about any suitable supporting pin 42. The braking effort of the band may be predetermined by the length of the arm 43 of the brake lever.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. A speed reducing mechanism of the class described, comprising a base, a prime mover mounted upon the base, a driven shaft extending outwardly from the prime mover and operatively engaged with a plurality of driving gears of various diameters, a pair of aligned bearings mounted upon the base, a rotatable drum disposed between said bearings and rotatably supported thereby by stub shafts whose ends are journaled within said bearings, the opposite ends of said stub shafts terminating in bevel gears within the drum, a stub shaft rotatably mounted within said drum at right angles to the other of said stub shafts, companion bevel gears rotatably mounted on said single stub shaft and intermeshing with the other of said bevel gears, one end of said stub shafts extending outwardly beyond said drum and provided with a sprocket wheel, another sprocket wheel mounted upon one end of the shaft of said prime mover and in alignment with the sprocket wheel carried by said stub shaft, a sprocket chain embracing both of said sprocket wheels, the other of said stub shafts being provided with a plurality of driven gears of various diameters and adapted for operative engagement with the said driving gears.

2. A speed reducing mechanism of the class described, comprising a base, a prime mover mounted upon the base and having a drive shaft extending outwardly from both ends thereof, a pair of aligned bearings mounted upon the base, a hollow rotatable drum rotatably mounted between said bearings by a pair of aligned stub shafts extending outwardly therefrom, whose outermost ends are directly connected with the shaft of the prime mover, the innermost ends of the aligned stub shafts terminating in bevel gears, a single stub shaft rotatably mounted within the drum at right angles to said aligned stub shafts, companion bevel gears rotatably mounted on the single stub shaft and in operative engagement with the other of said bevel gears.

JOE CAHILL.